United States Patent
Kamata et al.

(10) Patent No.: US 9,776,164 B2
(45) Date of Patent: Oct. 3, 2017

(54) REACTOR

(71) Applicant: IHI CORPORATION, Tokyo (JP)

(72) Inventors: Hiroyuki Kamata, Tokyo (JP); Koki Hamada, Tokyo (JP); Takuya Yoshinoya, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 14/976,906

(22) Filed: Dec. 21, 2015

(65) Prior Publication Data

US 2016/0107138 A1 Apr. 21, 2016

Related U.S. Application Data

(63) Continuation of application No. PCT/JP2014/066934, filed on Jun. 26, 2014.

(30) Foreign Application Priority Data

Jun. 27, 2013 (JP) .................................. 2013-134887

(51) Int. Cl.
  *B01J 19/24* (2006.01)
  *B01J 19/00* (2006.01)
  *B01F 5/00* (2006.01)

(52) U.S. Cl.
  CPC ........... *B01J 19/249* (2013.01); *B01F 5/0082* (2013.01); *B01J 19/0093* (2013.01); *B01J 19/24* (2013.01);
  (Continued)

(58) Field of Classification Search
  CPC .... B01J 19/0093; B01J 19/24; B01J 19/2405; B01J 19/2485; B01J 19/249;
  (Continued)

(56) References Cited

U.S. PATENT DOCUMENTS 5,130,208 A 7/1992 Maus et al.
2004/0228781 A1 11/2004 Tonkovich et al.
(Continued)

FOREIGN PATENT DOCUMENTS

CN 101379642 A 3/2009
CN 102481568 A 5/2012
(Continued)

OTHER PUBLICATIONS

Extended European Search Report of EP 14818625.7 dated Feb. 21, 2017.
(Continued)

*Primary Examiner* — Lessanework Seifu
(74) *Attorney, Agent, or Firm* — Amster, Rothstein & Ebenstein LLP

(57) ABSTRACT

A reactor includes: a reaction-side flow passage through which a fluid as a reaction object flows; and a catalyst structure provided in the reaction-side flow passage. The catalyst structure includes: a body part formed in a raised and depressed plate shape to partition the reaction-side flow passage into a plurality of flow passages disposed side by side in a direction perpendicular to a flow direction of the fluid; a catalyst carried on the body part to promote a reaction of the fluid; and one or more communication holes (grooves) to make the plurality of flow passages partitioned by the body part communicate with each other.

8 Claims, 4 Drawing Sheets

(52) U.S. Cl.
CPC ............ *B01J 2219/00054* (2013.01); *B01J 2219/0086* (2013.01); *B01J 2219/00783* (2013.01); *B01J 2219/00835* (2013.01); *B01J 2219/00873* (2013.01); *B01J 2219/00889* (2013.01); *B01J 2219/00898* (2013.01); *B01J 2219/24* (2013.01); *B01J 2219/246* (2013.01); *B01J 2219/2453* (2013.01); *B01J 2219/2459* (2013.01); *B01J 2219/2465* (2013.01); *B01J 2219/2472* (2013.01); *B01J 2219/2479* (2013.01); *B01J 2219/2486* (2013.01)

(58) Field of Classification Search
CPC ............ B01J 19/2495; B01J 2219/2406; B01J 2219/2422; B01J 2219/2428; B01J 2219/2432; B01J 2219/24; B01J 2219/00783; B01J 2219/00786; B01J 2219/00835; B01J 2219/00889
See application file for complete search history.

(56) References Cited

U.S. PATENT DOCUMENTS

| | | | | |
|---|---|---|---|---|
| 2007/0056721 | A1* | 3/2007 | Usui | F28D 7/1684 165/183 |
| 2007/0197382 | A1 | 8/2007 | West | |
| 2008/0148635 | A1* | 6/2008 | Bowe | B01J 19/249 48/127.7 |
| 2009/0029228 | A1 | 1/2009 | Shibata et al. | |
| 2009/0253814 | A1* | 10/2009 | Schodel | B01J 19/249 518/700 |
| 2010/0051246 | A1 | 3/2010 | Kim et al. | |
| 2010/0196779 | A1 | 8/2010 | Koyama et al. | |
| 2012/0177550 | A1 | 7/2012 | Tsujii et al. | |

FOREIGN PATENT DOCUMENTS

| | | | |
|---|---|---|---|
| EP | 2478960 | A1 | 7/2012 |
| FR | 2 588 397 | A | 4/1987 |
| GB | 2 181 578 | A | 4/1987 |
| JP | S62-90742 | U | 6/1987 |
| JP | H06-345404 | A | 12/1994 |
| JP | 2000-154001 | A | 6/2000 |
| JP | 2002-022374 | A | 1/2002 |
| JP | 2002-143675 | A | 5/2002 |
| JP | 2003-282098 | A | 10/2003 |
| JP | 2006-278294 | A | 10/2006 |
| JP | 2007-237044 | A | 9/2007 |
| JP | 2007-244944 | A | 9/2007 |
| JP | 2007-275823 | | 10/2007 |
| JP | 2007534457 | A | 11/2007 |
| JP | 2009078227 | A | 4/2009 |
| JP | 2011-062618 | A | 3/2011 |
| JP | 5060564 | B2 | 8/2012 |
| JP | 5354908 | B2 | 11/2013 |
| KR | 20080052931 | A | 6/2008 |
| WO | 2006/109464 | A1 | 10/2006 |
| WO | 2007/088832 | A1 | 8/2007 |
| WO | 2008/069426 | A1 | 6/2008 |
| WO | 2006095204 | A1 | 9/2009 |
| WO | 2011/033737 | A1 | 3/2011 |

OTHER PUBLICATIONS

Office Action dated Jul. 4, 2017 in JP Application No. 2015-524104.

* cited by examiner

REACTOR

CROSS REFERENCE TO RELATED APPLICATIONS

This application is a continuation application of International Application No. PCT/JP2014/066934, filed on Jun. 26, 2014, which claims priority to Japanese Patent Application No. 2013-134887, filed on Jun. 27, 2013, the entire contents of which are incorporated by reference herein.

BACKGROUND

1. Technical Field

The present disclosure relates to a reactor that carries out a reaction using a catalyst structure that promotes the reaction of a reaction fluid, which is the fluid as a reaction object.

2. Description of the Related Art

Since a reactor (a compact reactor) that uses a minute space as a reaction field, such as a reactor in which at least one side of a flow passage cross section is approximately several millimeters, and a microreactor in which at least one side of a flow passage cross section is less than 1 millimeter, has a large specific surface area per unit volume, heat transfer efficiency is high, and a reaction rate and a yield can be improved. In addition, since convection and a diffusion mode can be arbitrarily set, control for actively setting quick mixing and density distribution can be performed. Accordingly, it becomes possible to strictly control a reaction in the above-mentioned reactor.

In such a reactor, a catalyst is arranged in a reaction-side flow passage (the reaction field), a fluid as a reaction object (hereinafter referred to as a reaction fluid) flows through the reaction-side flow passage, and thereby a reaction is promoted. Japanese Patent Laid-Open Publication No. 2000-154001 (Patent Literature 1) discloses a technology of arranging a catalyst in a reaction-side flow passage. In this technology, the catalyst is carried on a metal plate of a corrugated-plate shape (a corrugated shape), and the metal plate carrying the catalyst is installed in the reaction-side flow passage so that the catalyst is uniformly arranged throughout the reaction-side flow passage.

SUMMARY

In the technology described in the above-described Patent Literature 1, an inside of the reaction-side flow passage is partitioned by the metal plate, thereby a plurality of flow passages is formed, and flows of the reaction fluids that flow through the flow passages become a laminar flow.

For this reason, a mass transfer coefficient from bulks (portions of the reaction fluids that have not touched interfaces) of the reaction fluids that flow through the flow passages partitioned by the metal plate to a catalyst surface becomes small, and a diffusion resistance on the catalyst surface becomes large. Accordingly, contact efficiency of the reaction fluids and the catalyst is rate-limited, and that reaction efficiency might be suppressed.

In addition, since the reaction-side flow passage is formed with the plurality of flow passages partitioned by the metal plate, the reaction fluids are guided to an outlet, while flow rate distribution of an inlet of the reaction-side flow passage is maintained as it is. In this case, when the flow rate distribution of the inlet has a deviation, reaction efficiency in a point having a large flow rate decreases more than that in a point having a small flow rate, and reaction efficiency of a whole reactor might decrease.

In view of such problems, the present disclosure aims at providing a reactor that can improve contact efficiency of a fluid as a reaction object and a catalyst, and can achieve improvement in reaction efficiency of the fluid.

One aspect of the present disclosure is a reactor including: a reaction-side flow passage through which a fluid as a reaction object flows; and a catalyst structure provided in the reaction-side flow passage. The catalyst includes: a body part formed in a raised and depressed plate shape, the body part partitioning the reaction-side flow passage into a plurality of flow passages disposed side by side in a direction perpendicular to a flow direction of the fluid, a catalyst carried on the body part to promote a reaction of the fluid, and one or more communication holes to make the plurality of flow passages partitioned by the body part communicate with each other.

The communication hole may be configured as a groove provided in at least one of a raised point and a depressed point in the body part.

The catalyst structure may further include a flat plate in contact with at least one of the raised point and the depressed point in the body part. The communication hole may be configured as a groove provided in at least one of a point in contact with the raised point and a point in contact with the depressed point of the body part in the flat plate.

The communication hole may be a through hole formed in the body part.

A size of the communication hole may be smaller than a flow passage cross-sectional area of the flow passage partitioned by the body part.

The catalyst structure may further include a temperature controller that heats or cools the fluid from an outside of the reaction-side flow passage.

The temperature controller may include a heat-medium-side flow passage through which a heat medium flows to perform heat exchange with the fluid flowing through the reaction-side flow passage, and the heat-medium-side flow passage may be provided side by side with the reaction-side flow passage through a heat transfer partition wall.

The heat medium may be gas.

The reaction-side flow passage and the heat-medium-side flow passage may be alternately stacked.

According to the present disclosure, contact efficiency of the fluid as the reaction object and the catalyst can be improved, and it becomes possible to achieve improvement in reaction efficiency of the fluid.

DESCRIPTION OF THE EMBODIMENTS

Hereinafter, an embodiment of the present disclosure will be explained in detail with reference to accompanying drawings. Dimensions, materials, other specific numerical values, etc. shown in such an embodiment are merely exemplification for facilitating understanding of the disclosure, and they do not limit the present invention. Note that in the specification and the drawings, overlapping explanation of elements having substantially the same functions and configurations is omitted by attaching the same symbols to the elements, and that illustration of elements having no direct relation to the present disclosure is omitted. In addition, in the following explanation, a fluid as a reaction object is referred to as a reaction fluid.

(Reactor 100)

Figure 1A:
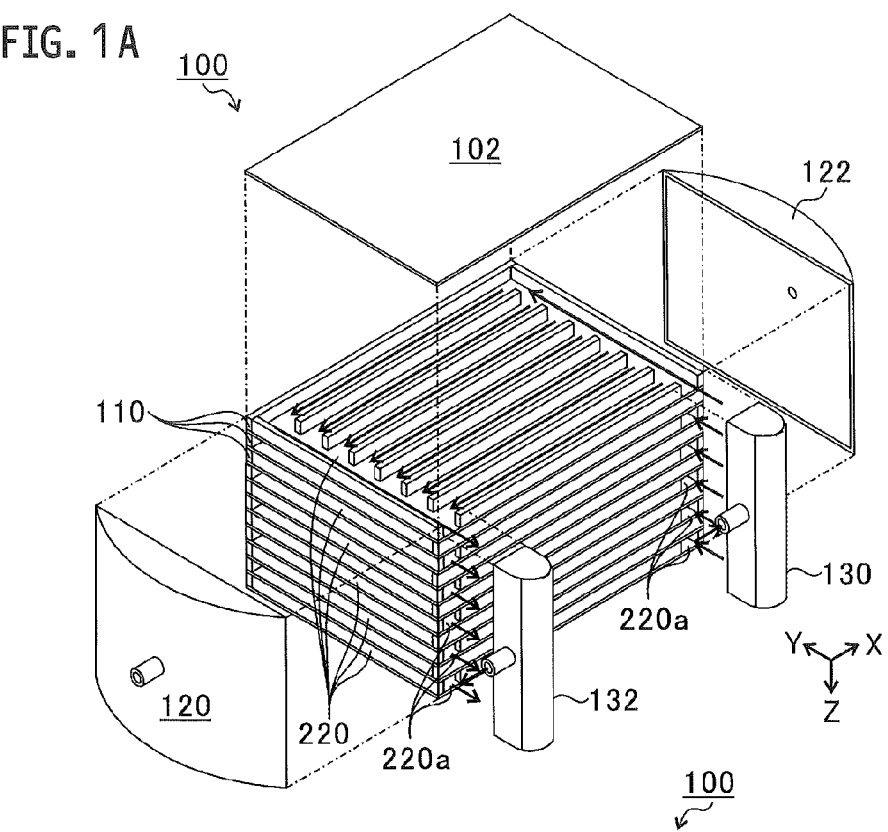
FIGS. 1A and 1B are views for illustrating a reactor according to an embodiment of the present disclosure.
Figure 1B:
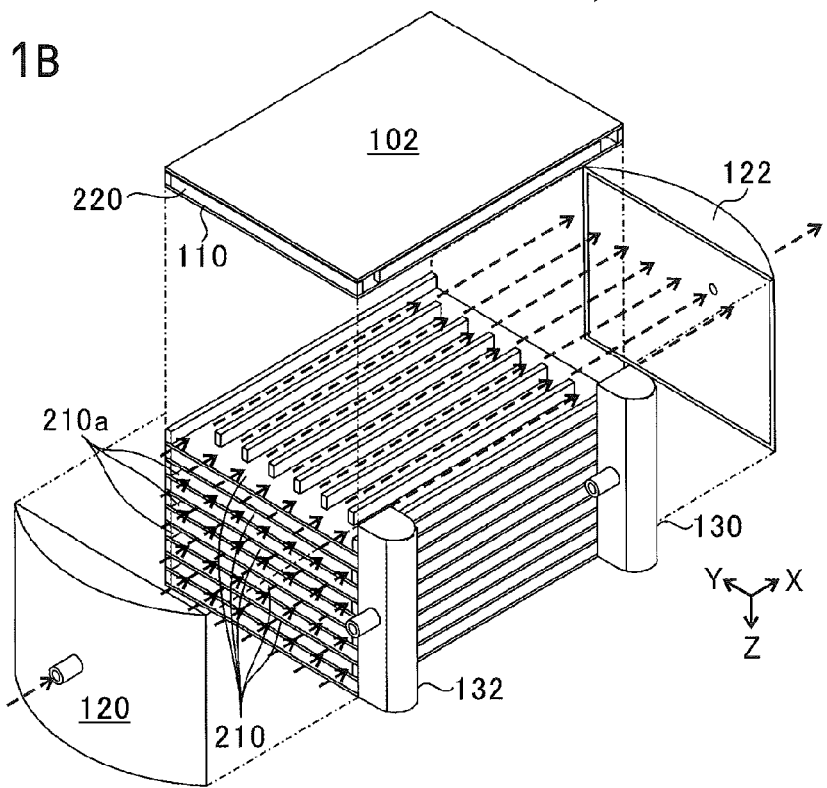
Figure 2A:
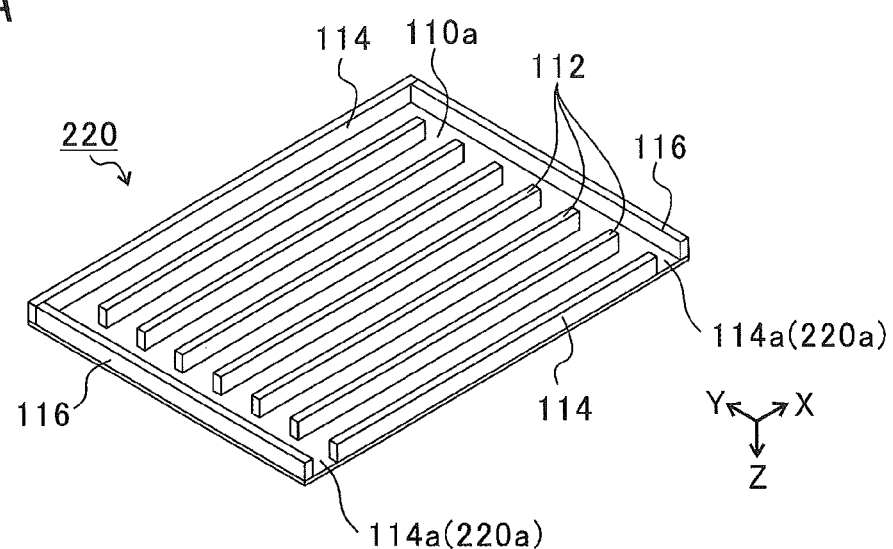
FIG. 2A is a view for illustrating a heat-medium-side flow passage according to the embodiment of the present disclosure.
Figure 2B:
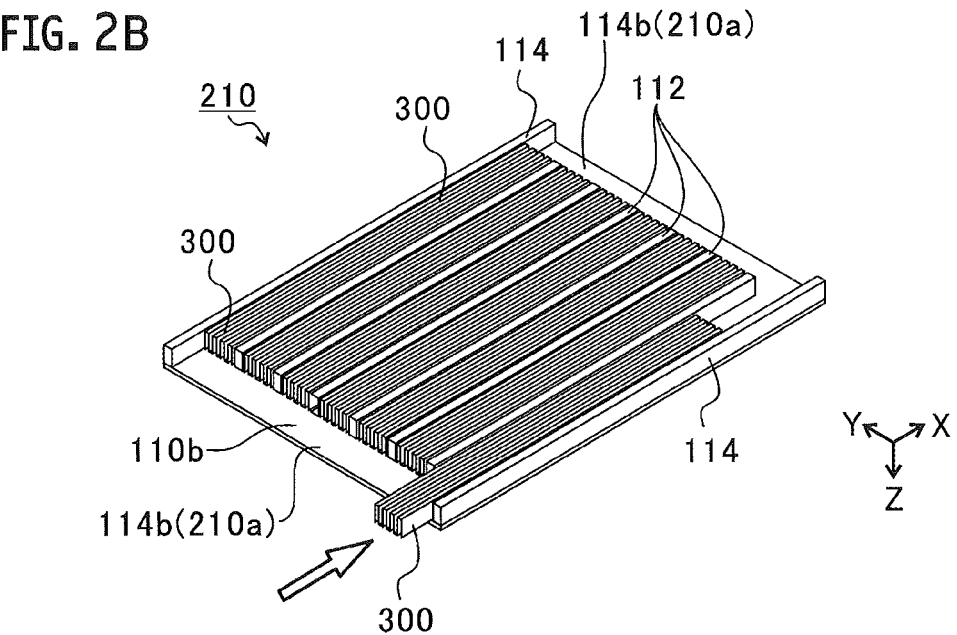
FIG. 2B is a view for illustrating a reaction-side flow passage according to the embodiment of the present disclosure.

FIGS. 1A and 1B are views for illustrating a reactor 100 according to the embodiment. FIG. 2A is a view for illustrating a heat-medium-side flow passage 220. FIG. 2B is a view for illustrating a reaction-side flow passage 210. An X-axis, a Y-axis, and a Z-axis that perpendicularly intersect with each other are defined as shown in each drawing. In FIGS. 1A and 1B, description of a catalyst structure 300 is omitted in order to facilitate understanding.

As shown in FIGS. 1A and 1B, the reactor 100 has a structure in which a plurality of heat transfer partition walls 110 is stacked while being separated from each other at a predetermined interval. In addition, the reactor 100 includes: a top surface 102; the heat transfer partition walls 110 (they are also shown with reference characters 110$a$ or 110$b$ in some cases); a reaction fluid inlet 120; a reaction fluid outlet 122; a heat medium inlet 130; and a heat medium outlet 132. These are all formed with a metal material (for example, a heat-resistant metal, such as stainless steel (SUS310, Haynes (registered trademark) 230)).

When the reactor 100 is manufactured, the heat transfer partition walls 110 are stacked to be joined to each other, and the top surface 102 is joined to the uppermost heat transfer partition wall 110. The reaction fluid inlet 120, the reaction fluid outlet 122, the heat medium inlet 130, and the heat medium outlet 132 are then joined to the stacked heat transfer partition walls 110, respectively. Although a joining method used in manufacturing the reactor 100 is not limited, for example, TIG (Tungsten Inert Gas) welding and diffusion bonding can be utilized.

Among spaces partitioned by the heat transfer partition walls 110, a space, which communicates with the reaction fluid inlet 120 and the reaction fluid outlet 122 through holes 210$a$ formed on a reaction fluid inlet 120 side and a reaction fluid outlet 122 side, serves as the reaction-side flow passage 210. In addition, among the spaces partitioned by the heat transfer partition walls 110, a space, which communicates with the heat medium inlet 130 and the heat medium outlet 132 through holes 220$a$ formed on a heat medium inlet 130 side and a heat medium outlet 132 side, serves as the heat-medium-side flow passage 220. In the reactor 100 of the embodiment, the reaction-side flow passage 210 and the heat-medium-side flow passage 220 are provided side by side with (in parallel to) each other while being partitioned by the heat transfer partition wall 110, and the reaction-side flow passage 210 and the heat-medium-side flow passage 220 are alternately stacked.

As shown in FIG. 2A, a bottom surface of the heat-medium-side flow passage 220 is configured with the heat transfer partition wall 110 (it is shown with the reference character 110$a$ in FIG. 2A). In addition, a top surface of the heat-medium-side flow passage 220 is configured with the top surface 102 or the heat transfer partition wall 110 (it is shown with the reference character 110$b$ in FIG. 2B) that will be mentioned later. A plurality of ribs 112 for holding a gap between the heat transfer partition walls 110 is erected on the heat transfer partition wall 110$a$. Side wall parts 114 that configure side walls of the reactor 100, and side bars 116 for preventing mixing-in of the reaction fluid from the reaction fluid inlet 120 are erected on the heat transfer partition wall 110$a$. In addition, in the side wall parts 114 located on both sides of the heat transfer partition wall 110$a$, a notch 114$a$ is provided in the side wall part 114 to which the heat medium inlet 130 and the heat medium outlet 132 are joined. When the heat transfer partition walls 110 are stacked, the notch 114$a$ forms the hole 220$a$. A heat medium is introduced into the heat-medium-side flow passage 220 from the heat medium inlet 130 through the hole 220$a$ by the formation of the hole 220$a$. Alternatively, the heat medium is discharged from an inside of the heat-medium-side flow passage 220 to the heat medium outlet 132 through the hole 220$a$.

A bottom surface of the reaction-side flow passage 210 is configured with the heat transfer partition wall 110$b$ as shown in FIG. 2B. In addition, a top surface of the reaction-side flow passage 210 is configured with the heat transfer partition wall 110$a$. The plurality of ribs 112 for holding the gap between the heat transfer partition walls 110, and the plurality of side wall parts 114 are erected also on the heat transfer partition wall 110$b$ similarly to the above-described heat transfer partition wall 110$a$. Note that unlike the heat transfer partition wall 110$a$, the side bar 116 is not provided on the heat transfer partition wall 110$b$. Therefore, a gap 114$b$ is formed between the wall parts 114 located on both sides of the heat transfer partition wall 110$b$. The gap 114$b$ forms the hole 210$a$, when the heat transfer partition walls 110 are stacked. A reaction fluid is introduced into the reaction-side flow passage 210 from the reaction fluid inlet 120 through the hole 210$a$ by the formation of the hole 210$a$. Alternatively, a reaction product is discharged from an inside of the reaction-side flow passage 210 to the reaction fluid outlet 122 through the hole 210$a$.

A catalyst structure 300 that promotes a reaction of the reaction fluid is provided in the reaction-side flow passage 210. A specific configuration of the catalyst structure 300 will be explained in detail later.

As shown by arrows of continuous lines in FIG. 1A, the heat medium is introduced from the heat medium inlet 130, flows through the heat-medium-side flow passage 220, and is discharged from the heat medium outlet 132. Meanwhile, as shown by arrows of broken lines in FIG. 1B, the reaction fluid is introduced from the reaction fluid inlet 120, flows through the reaction-side flow passage 210, and is discharged from the reaction fluid outlet 122. Note that the reaction fluid and the heat medium have a relation of counterflows in the embodiment as shown in FIG. 1B.

As described above, the reaction-side flow passage 210 and the heat-medium-side flow passage 220 are provided side by side with each other while being partitioned by the heat transfer partition wall 110. According to this configuration, the heat medium performs heat exchange with the reaction fluid that flows through the reaction-side flow passage 210 through the heat transfer partition wall 110, in flowing through the heat-medium-side flow passage 220.

Namely, when an endothermic reaction is carried out in the reaction-side flow passage 210, the heat-medium-side flow passage 220 and the heat medium supply heat to (heat) the reaction fluid that flows through the reaction-side flow passage 210. When an exothermic reaction is carried out in the reaction-side flow passage 210, the heat-medium-side flow passage 220 and the heat medium function as a temperature controller (temperature control portion) that removes heat of (cools) the reaction fluid that flows through the reaction-side flow passage 210.

The endothermic reaction, for example, includes a steam reforming reaction of methane shown in the following Chemical formula (1), and a dry reforming reaction of methane shown in Chemical formula (2).

$$CH_4 + H_2O \rightarrow 3H_2 + CO \quad \text{Chemical formula (1)}$$

$$CH_4 + CO_2 \rightarrow 2H_2 + 2CO \quad \text{Chemical formula (2)}$$

In addition, the exothermic reaction, for example, includes: a shift reaction shown in the following Chemical formula (3); a methanation reaction shown in Chemical formula (4); and an FT (Fischer Tropsch) synthesis reaction shown in Chemical formula (5).

$$CO + H_2O \rightarrow CO_2 + H_2 \quad \text{Chemical formula (3)}$$

$$CO + 3H_2 \rightarrow CH_4 + H_2O \quad \text{Chemical formula (4)}$$

$$(2n+1)H_2 + nCO \rightarrow C_nH_{2n+2} + nH_2O \quad \text{Chemical formula (5)}$$

Note that gas flows through the heat-medium-side flow passage 220 as the heat medium in the embodiment. In this case, handling of the reactor becomes easy, compared with a case where the heat medium is configured with liquid.

As explained above, the reaction fluid flows through the reaction-side flow passage 210 provided as a reaction field, and the heat medium that performs heat exchange with the reaction fluid flows through the heat-medium-side flow passage 220. In the reactor 100 according to the embodiment, the heat-medium-side flow passage 220 is provided side by side with the reaction-side flow passage 210 across the heat transfer partition wall 110. Accordingly, the reactions (the endothermic reaction and the exothermic reaction) are efficiently carried out in the reaction-side flow passage 210.

Hereinafter, there will be explained in detail the catalyst structure 300 that is provided in the reaction-side flow passage 210 of the reactor 100, and promotes the reaction of the reaction fluid.

(Catalyst Structure 300)

Figure 3A:
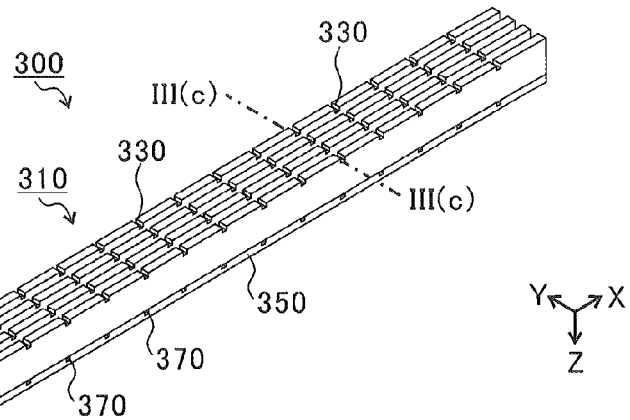
FIGS. 3A to 3C are views for illustrating a configuration of a catalyst structure according to the embodiment of the present disclosure.
Figure 3B:
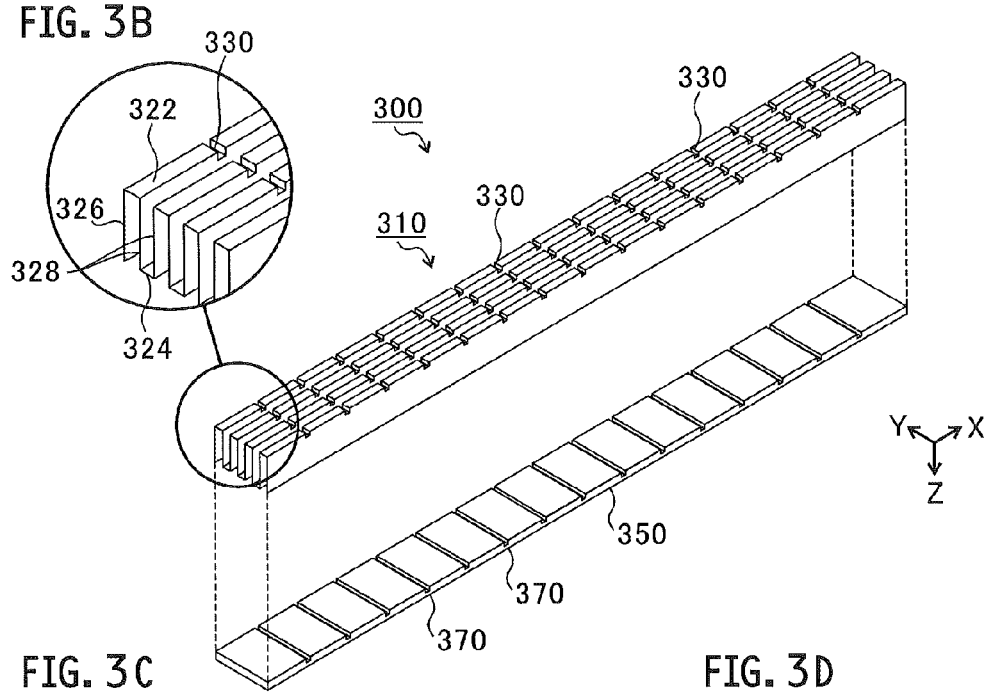
Figure 3C:
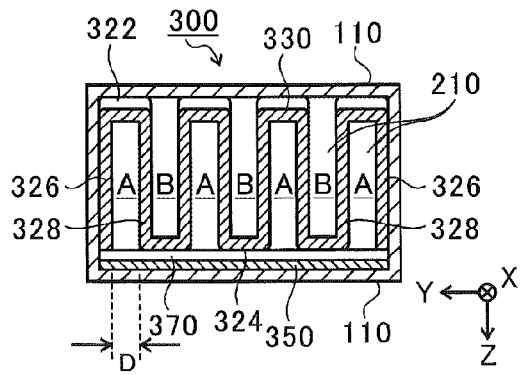
Figure 3D:
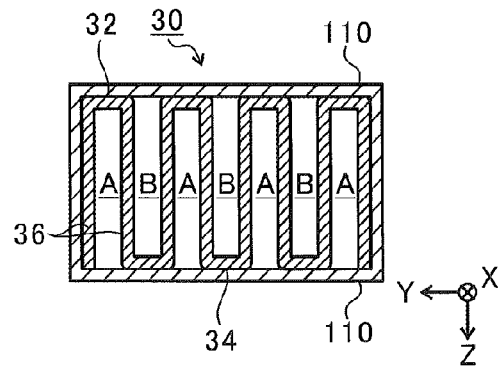
FIG. 3D is a view for illustrating a configuration of a catalyst structure as a comparative example.

FIGS. 3A to 3D are views for illustrating the specific configuration of the catalyst structure 300. FIG. 3A is a perspective view of the catalyst structure 300. FIG. 3B is an exploded perspective view of the catalyst structure 300. FIG. 3C is a YZ cross-sectional view of a line III(c)-III(c) in FIG. 3A, in the catalyst structure 300 being installed in the reaction-side flow passage 210. FIG. 3D is a view for illustrating a catalyst structure 30 of a comparative example. An X-axis, a Y-axis, and a Z-axis that perpendicularly intersect with each other are defined as shown in FIGS. 3A to 3D. In addition, a flow direction of the reaction fluid is shown by an outlined arrow in FIG. 3A.

As shown in FIG. 3A, the catalyst structure 300 includes a body part 310 that partitions the reaction-side flow passage 210 into a plurality of flow passages, and a flat plate 350. The body part 310 is configured with a raised and depressed plate-shaped metal, i.e., a corrugated-plate-shaped (corrugated-shaped) metal plate. Specifically, the body part 310 includes: a raised part 322 (a raised point); a depressed part 324 (a depressed point); a side wall part 326 that extends in a Z-axis direction from the raised part 322 in FIGS. 3B and 3C; and a partition wall part 328 that extends in the Z-axis direction in FIGS. 3B and 3C, and connects the raised part 322 and the depressed part 324.

The body part 310 partitions the reaction-side flow passage 210 into a plurality of flow passages disposed in parallel in a direction perpendicular to the flow direction of the reaction fluid. Specifically, as shown in FIG. 3C, a flow passage A is formed by a space surrounded by the raised part 322 and the partition wall part 328 (or the partition wall part 328 and the side wall part 326) of the body part 310, the heat transfer partition wall 110 included in the reaction-side flow passage 210, and the rib 112 (or the rib 112 and the side wall part 114). In addition, as shown in FIG. 3C, a flow passage B is formed by a space surrounded by the depressed part 324 and the partition wall part 328 of the body part 310, and the heat transfer partition wall 110 included in the reaction-side flow passage 210.

In addition, a plurality of grooves 330 is provided in the raised part 322 in the body part 310. In the embodiment, the grooves 330 are formed linearly extending in a Y-axis direction in FIGS. 3A to 3C over the plurality of raised parts 322. However, positions in an X-axis direction of the grooves 330 may be different for each raised part 322, as long as the grooves 330 extend in the Y-axis direction.

The flat plate 350 includes metal. The flat plate 350 is provided in contact with the depressed parts 324 in the body part 310. A plurality of grooves 370 is provided in points in the flat plate 350 in contact with the depressed parts 324 of the body part 310.

In the embodiment, the groove 370 is formed linearly extending in the Y-axis direction over a whole width in the Y-axis direction of the flat plate 350. However, the groove 370 need not necessarily be formed over the whole width of the flat plate 350.

Joining is performed by brazing, welding, etc. in a state where the flat plate 350 is in contact with the depressed parts 324 of the body part 310, and thereby a structure is formed. A surface of the formed structure is then made to carry a catalyst, and thereby the structure is made into the catalyst structure 300.

As shown in FIG. 3D, the catalyst structure 30 of the comparative example includes a corrugated-plate-shaped body part without a groove, and a catalyst carried on the body part. When the catalyst structure 30 is installed in the reaction-side flow passage 210, a flow passage A is formed among a raised part 32, a partition wall part 36, and the heat transfer partition wall 110 included in the reaction-side flow passage 210, and a flow passage B is formed among a depressed part 34, the partition wall part 36, and the heat transfer partition wall 110. The catalyst structure 30 preferably abuts against the heat transfer partition wall 110 from a viewpoint of improvement in heat transfer efficiency with the heat-medium-side flow passage 220. Therefore, a height of the catalyst structure 30 in the Z-axis direction is substantially equal to a height of the reaction-side flow passage 210 in the Z-axis direction (the reaction-side flow passage 210 partitioned by the rib 112). In addition, a length of the catalyst structure 30 in the Y-axis direction is substantially equal to a length of the reaction-side flow passage 210 in the Y-axis direction (the reaction-side flow passage 210 partitioned by the rib 112).

Accordingly, when the catalyst structure 30 is installed in the reaction-side flow passage 210, a reaction fluid that flows through the flow passage A, and a reaction fluid that flows through the flow passage B are not mixed with each other.

In addition, since an object that hinders flows of the reaction fluids is not present in the flow passages A and B, the reaction fluids that flow through the flow passages A and B easily become a laminar flow. For this reason, a mass transfer coefficient from bulks of the reaction fluids that flow through the flow passages A and B to a catalyst surface becomes small, and a diffusion resistance on the catalyst surface becomes large.

In addition, since the reaction-side flow passage 210 is formed with the plurality of flow passages A and B partitioned by a metal plate (the catalyst structure 30), the reaction fluids are guided to an outlet, while flow rate distribution in an inlet of the reaction-side flow passage 210 is maintained as it is. In this case, when the flow rate distribution of the inlet has a deviation, reaction efficiency in a point having a large flow rate may decrease more than that in a point having a small flow rate. That is, reaction efficiency of the whole reactor might decrease.

Consequently, the catalyst structure 300 according to the embodiment includes the grooves 330 and 370 in the body part 310 and the flat plate 350. Accordingly, as shown in FIG. 3C, the groove 330 is formed between the raised part 322 and the heat transfer partition wall 110, and functions as a communication hole that makes the flow passages B communicate with each other. In addition, the groove 370 is formed between the depressed part 324 and the flat plate 350, and functions as a communication hole that makes the flow passages A communicate with each other.

As described above, the catalyst structure 300 includes the grooves 330 and 370. Accordingly, in the catalyst structure 300 being installed in the reaction-side flow passage 210, the fluids that flow through the flow passages A are mixed through the groove 370 (the communication hole), and the fluids that flow through the flow passages B are mixed through the groove 330 (the communication hole). As a result, flows of the reaction fluids that flow through the reaction-side flow passage 210 (in the catalyst structure 300) can be made a turbulent flow.

As a result of this, a mass transfer coefficient from the bulks of the reaction fluids that flow through the reaction-side flow passage 210 to the catalyst surface can be increased, and it becomes possible to reduce the diffusion resistance on the catalyst surface. Accordingly, contact efficiency of the reaction fluids and the catalyst can be improved, and it becomes possible to improve reaction efficiency.

In addition, since the flows of the reaction fluids that flow through the reaction-side flow passage 210 become the turbulent flow, the reaction fluids are mixed while flowing through the reaction-side flow passage 210. Accordingly, even if the flow rate distribution (density distribution) of the inlet of the reaction-side flow passage 210 has a deviation, the flow rate distribution is equalized while the reaction fluids flow through the reaction-side flow passage 210. As a result of this, variation in the reaction efficiency in the reaction-side flow passage 210 can be reduced, and it becomes possible to suppress a situation where reaction efficiency of the whole reactor 100 decreases.

In addition, since the raised parts 322 other than the grooves 330 and 370, and the flat plate 350 come into contact with the heat transfer partition wall 110 included in the reaction-side flow passage 210, it becomes possible to make the flows of the reaction fluids the turbulent flow, while maintaining the heat transfer efficiency with the heat-medium-side flow passage 220.

Note that the body part 310 and the flat plate 350 included in the catalyst structure 300 are configured with a heat-resistant alloy that mainly contains Fe (iron), Cr (chromium), Al (aluminum), and Y (yttrium), for example, a metal of Fecralloy (registered trademark) or the like. In addition, a carrier of the catalyst is appropriately selected according to a reaction carried out by the reactor 100 and, for example, it is one or more carriers selected from a group of $Al_2O_3$ (alumina), $TiO_2$ (titania), $ZrO_2$ (zirconia), $CeO_2$ (ceria), and $SiO_2$ (silica). In addition, the catalyst (an active metal) is appropriately selected according to the reaction carried out by the reactor 100 and, for example, it is one or more catalysts selected from a group of Ni (nickel), Co (cobalt), Fe (iron), Pt (platinum), Ru (ruthenium), Rh (rhodium), and Pd (palladium).

A size of the catalyst structure 300 will be explained although it does not limit the present invention. A thickness of the metal plate that configures the body part 310 and the flat plate 350 of the catalyst structure 300 is approximately 100 μm. A width of the catalyst structure 300 in the Y-axis direction (refer to FIG. 3A) is, for example, 12 mm. A height of the catalyst structure 300 in the Z-axis direction is, for example, 4 mm. In addition, sizes of the grooves 330 and 370 are smaller than flow passage cross-sectional areas of the flow passages A and B partitioned by the body part 310. Namely, heights (depths) of the grooves 330 and 370 in the Z-axis direction, and lengths thereof in the X-axis direction are, for example, shorter than a pitch D (refer to FIG. 3C) of the body part 310, and are approximately 100 μm to 1 mm.

(Manufacturing Method for Catalyst Structure 300)

Figure 4:
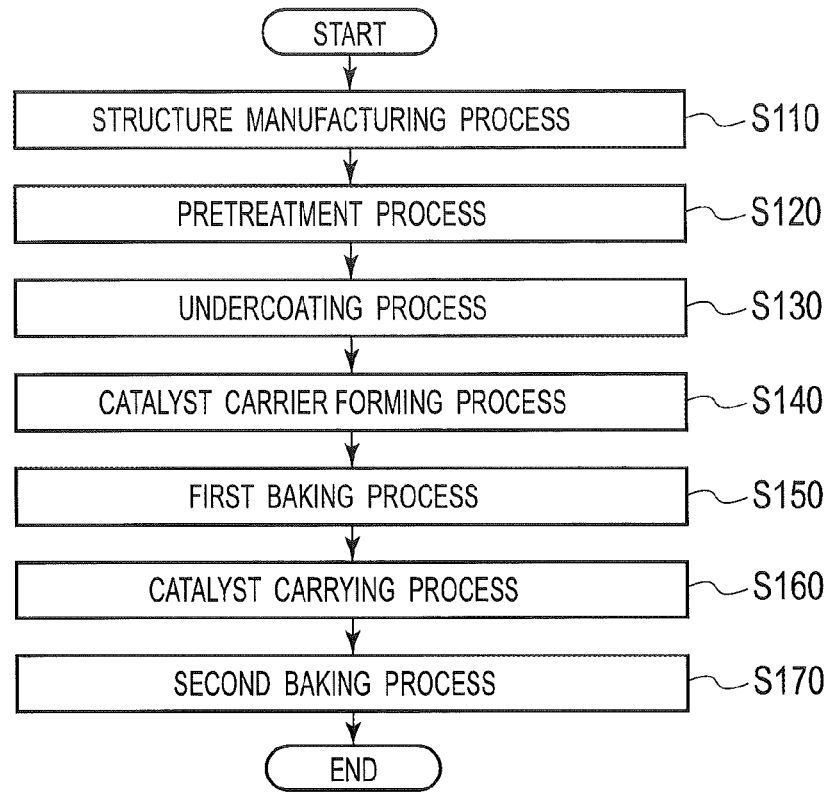
FIG. 4 is a flowchart for illustrating a flow of treatment in a manufacturing method for the catalyst structure according to the embodiment of the present disclosure.

Subsequently, a manufacturing method for the above-described catalyst structure 300 will be explained. FIG. 4 is a flowchart for illustrating a flow of treatment in the manufacturing method for the catalyst structure 300. As shown in FIG. 4, the manufacturing method for the catalyst structure 300 is configured to include: a structure manufacturing process S110; a pretreatment process S120; an undercoating process S130; a catalyst carrier forming process S140; a first baking process S150; a catalyst carrying process S160; and a second baking process S170. Hereinafter, each process will be mentioned in detail.

(Structure Manufacturing Process S110)

In the structure manufacturing process S110, the heat-resistant alloy that mainly contains Fe (iron), Cr (chromium), Al (aluminum), and Y (yttrium), for example, a metal plate of Fecralloy (registered trademark) or the like is processed into a corrugated-plate shape, processing to form the grooves 330 is applied to the metal plate, and then, the body part 310 is produced. In addition, processing to form the grooves 370 is applied to the heat-resistant alloy that mainly contains Fe (iron), Cr (chromium), Al (aluminum), and Y (yttrium), for example, the metal plate of Fecralloy (registered trademark) or the like, and thereby the flat plate 350 is produced.

Additionally, the depressed parts 324 of the body part 310 and the flat plate 350 are brought into contact with each other, joining by brazing, welding, etc. is performed to contact portions, and thereby a structure is formed (refer to FIGS. 3A to 3C).

(Pretreatment Process S120)

In the pretreatment process S120, the structure is degreased using acetone, subsequently, the structure is exposed under a predetermined gaseous atmosphere, and is heat-treated for a predetermined time at a predetermined temperature. As a result of this, a needle-like crystal that mainly contains $Al_2O_3$ can be deposited on a surface of the structure.

(Undercoating Process 130)

After the pretreatment process S120 is performed, the structure on which the needle-like crystal has been deposited is immersed in a suspension containing an undercoating agent (for example, boehmite) and nitric acid, and is subsequently pulled up from the suspension, and excess slurry is removed. The structure pulled up from the suspension is then dried. In this way, the structure is coated with the undercoating agent.

(Catalyst Carrier Forming Process S140)

After the undercoating process S130 is performed, the structure coated with the undercoating agent is immersed in a suspension containing a carrier (for example, γ-phase $Al_2O_3$) of a catalyst, boehmite, and nitric acid, and is subsequently pulled up from the suspension, and excess slurry is removed. The structure pulled up from the suspension is then dried. Subsequently, the structure is exposed under a predetermined gaseous atmosphere, and is heat-treated for a predetermined time at a predetermined temperature.

The catalyst carrier forming process S140 is repeatedly performed a plurality of times, and thereby a desired amount of catalyst carrier can be made to adhere onto the surface of the structure.

(First Baking Process S150)

After the catalyst carrier forming process S140 is performed, the structure to which the catalyst carrier adheres is exposed under a predetermined gaseous atmosphere, and is heat-treated for a predetermined time at a predetermined temperature, and the catalyst carrier is baked. As a result of this, a porous catalyst carrier is formed on the surface of the structure.

(Catalyst Carrying Process S160)

After the first baking process S150 is performed, the structure in which the porous catalyst carrier has been formed on the surface is immersed in a solution in which a salt of an active metal (for example, Ni) has been dissolved, and is subsequently pulled up from the solution, and the structure pulled up from the solution is dried.

The catalyst carrying process S160 is repeatedly performed a plurality of times, and thereby a desired amount of catalyst can be made to be carried on the surface of the structure.

(Second Baking Process S170)

After the catalyst carrying process S160 is performed, the structure carrying the catalyst is exposed under a predetermined gaseous atmosphere, and is heat-treated for a predetermined time at a predetermined temperature, and the catalyst is baked. As a result of this, a porous catalyst is formed on the surface of the structure.

As explained above, according to the catalyst structure 300, the reactor 100 including the catalyst structure 300, and the manufacturing method for the catalyst structure 300 according to the embodiment, contact efficiency of the reaction fluid and the catalyst can be improved, and it becomes possible to achieve improvement in reaction efficiency of the reaction fluid.

Modified Example

Figure 5:
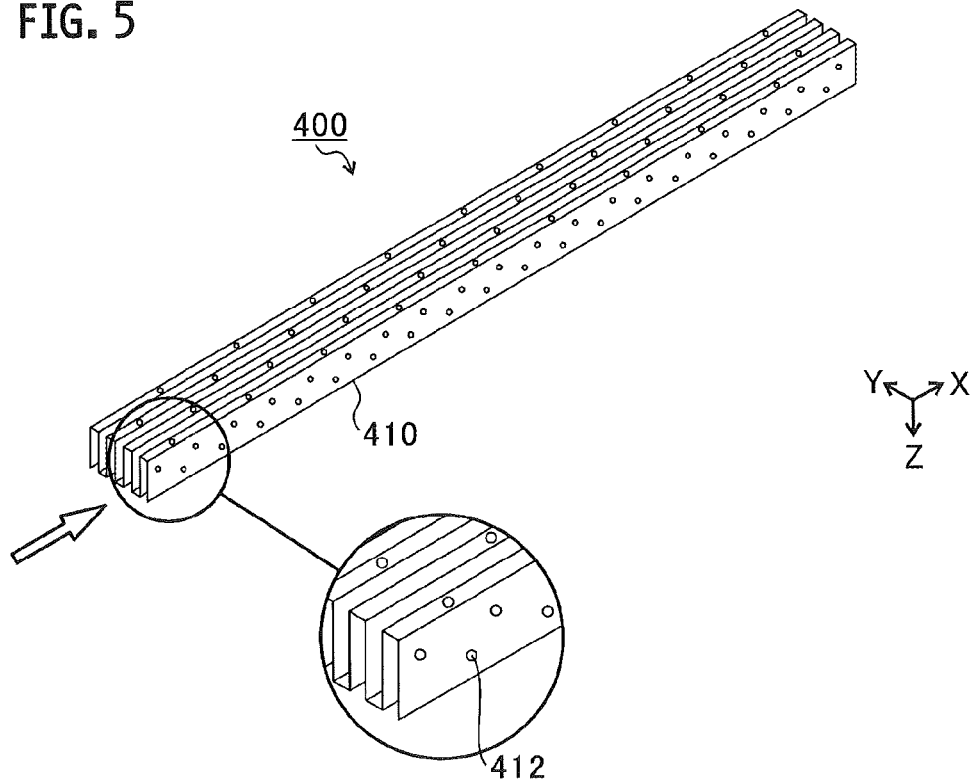
FIG. 5 is a view for illustrating a catalyst structure according to a modified example of the embodiment of the present disclosure.

FIG. 5 is a view for illustrating a catalyst structure 400 according to a modified example. An X-axis, a Y-axis, and a Z-axis that perpendicularly intersect with each other are defined as shown in FIG. 5. In addition, a flow direction of the reaction fluid is shown by an outlined arrow in FIG. 5.

As shown in FIG. 5, the catalyst structure 400 includes a body part 410 that partitions the reaction-side flow passage 210 into a plurality of flow passages. The body part 410 is configured with a raised and depressed plate-shaped metal, i.e., a corrugated-plate-shaped (corrugated-shaped) metal plate. In the modified example, a through hole 412 is formed in the body part 410, and the through hole 412 functions as a communication hole that makes the plurality of flow passages partitioned by the body part 410 communicate with each other.

Also by the reactor 100 including the catalyst structure 400 according to the modified example, in the catalyst structure 400 being installed in the reaction-side flow passage 210, a fluid that flows through the flow passage A is mixed with a reaction fluid that flows through the flow passage B through the through hole 412 (communication hole). In addition, a fluid that flows through the flow passage B is mixed with a reaction fluid that flows through the flow passage A through the through hole 412 (communication hole). Accordingly, flows of the reaction fluids that flow through the reaction-side flow passage 210 (in the catalyst structure 400) can be made a turbulent flow.

In addition, a size of the through hole 412 is smaller than flow passage cross-sectional areas of the flow passages A and B partitioned by the body part 410. Namely, a diameter of the through hole 412 is shorter than a pitch of the body part 410.

This diameter is, for example, approximately 100 μm to 1 mm. Note that although a case has been explained here as an example where the through hole 412 has a circular shape, a shape of the through hole 412 is not limited.

Hereinbefore, although the present embodiment has been explained with reference to the accompanying drawings, it is needless to say that the present invention is not limited to such an embodiment. It is apparent that those skilled in the art can conceive of various change examples or correction examples in a category described in claims, and they are also naturally understood to belong to the technical scope of the present invention.

For example, although in the above-described embodiment, a case has been explained as an example where the groove 330 is formed in the raised part 322 of the body part 310, the groove 330 may be formed in the depressed part 324 of the body part 310, or the groove 330 may be formed in the raised part 322 and the depressed part 324.

In addition, although a configuration has been explained in which the depressed part 324 of the body part 310 and the flat plate 350 are joined to each other, the flat plate 350 may be joined to the raised part 322 of the body part 310. In addition, two sets of flat plates 350 may be prepared, and may be joined to both the raised part 322 and the depressed part 324. In this case, the groove 370 may be provided in either one of the two sets of flat plates 350, or may be provided in both of them.

In addition, in the above-described embodiment, the heat-medium-side flow passage 220 has been explained as a temperature controller as an example. However, the temperature controller may be a heater or a cooler, as long as it can heat or cool the reaction fluid from an outside of the reaction-side flow passage 210.

In addition, although in the above-described embodiment, a case has been explained as an example where the heat medium that flows through the heat-medium-side flow passage 220 is gas, the heat medium may be liquid.

In addition, although in the above-described embodiment, the reactor 100 has been explained in which the reaction-side flow passage 210 and the heat-medium-side flow passage 220 are alternately stacked, they need not necessarily be stacked.

In addition, although in the above-described embodiment, a case has been explained as an example where the reaction fluid that flows through the reaction-side flow passage 210 and the heat medium that flows through the heat-medium-side flow passage 220 have the relation of counterflows, the reaction fluid and the heat medium may have a relation of parallel flows.

In addition, the manufacturing method for the catalyst structure (a method for carrying a catalyst on a structure) explained in the above-described embodiment is merely exemplification, and other methods can also be utilized.

What is claimed is:

1. A reactor, comprising:
a reaction-side flow passage through which a fluid as a reaction object flows; and
a catalyst structure separated from the reaction-side flow passage provided in the reaction-side flow passage, the catalyst structure including:
a body part formed in a plate shape having two or more raised points and two or more depressed points each alternately provided one by one, the body part partitioning the reaction-side flow passage into a plurality of flow passages disposed side by side in a direction perpendicular to a flow direction of the fluid,
a catalyst carried on the body part to promote a reaction of the fluid, and
communication holes to make the plurality of flow passages partitioned by the body part communicate with each other,
the communication holes comprising at least either: first groove parts each provided on a surface of each of the raised points and between each of the raised points and a wall defining the reaction-side flow passage; or second groove parts each provided on a surface of each of the depressed points and between each of the depressed points and the wall defining the reaction-side flow passage, each extending along the direction perpendicular to the flow direction of the fluid.

2. The reactor according to claim 1, wherein
the catalyst structure further includes a flat plate in contact with at least one of the raised point and the depressed point in the body part, and
the communication holes further comprise at least either: third groove parts each provided on the flat plate at a point in contact with each of the raised points; or fourth groove parts each provided on the flat plate at a point in contact with each of the depressed points, each extending along the direction perpendicular to the flow direction of the fluid.

3. The reactor according to claim 1, wherein
the communication hole is a through hole formed in the body part.

4. The reactor according to claim 1, wherein
a size of the communication hole is smaller than a flow passage cross-sectional area of the flow passage partitioned by the body part.

5. The reactor according to claim 1, further comprising a temperature controller configured to heat or cool the fluid from an outside of the reaction-side flow passage.

6. The reactor according to claim 5, wherein
the temperature controller includes a heat-medium-side flow passage through which a heat medium flows to perform heat exchange with the fluid flowing through the reaction-side flow passage, and the heat-medium-side flow passage is provided side by side with the reaction-side flow passage through a heat transfer partition wall.

7. The reactor according to claim 6, wherein the heat medium is gas.

8. The reactor according to claim 6, wherein the reaction-side flow passage and the heat-medium-side flow passage are alternately stacked.

* * * * *